Patented Sept. 25, 1945

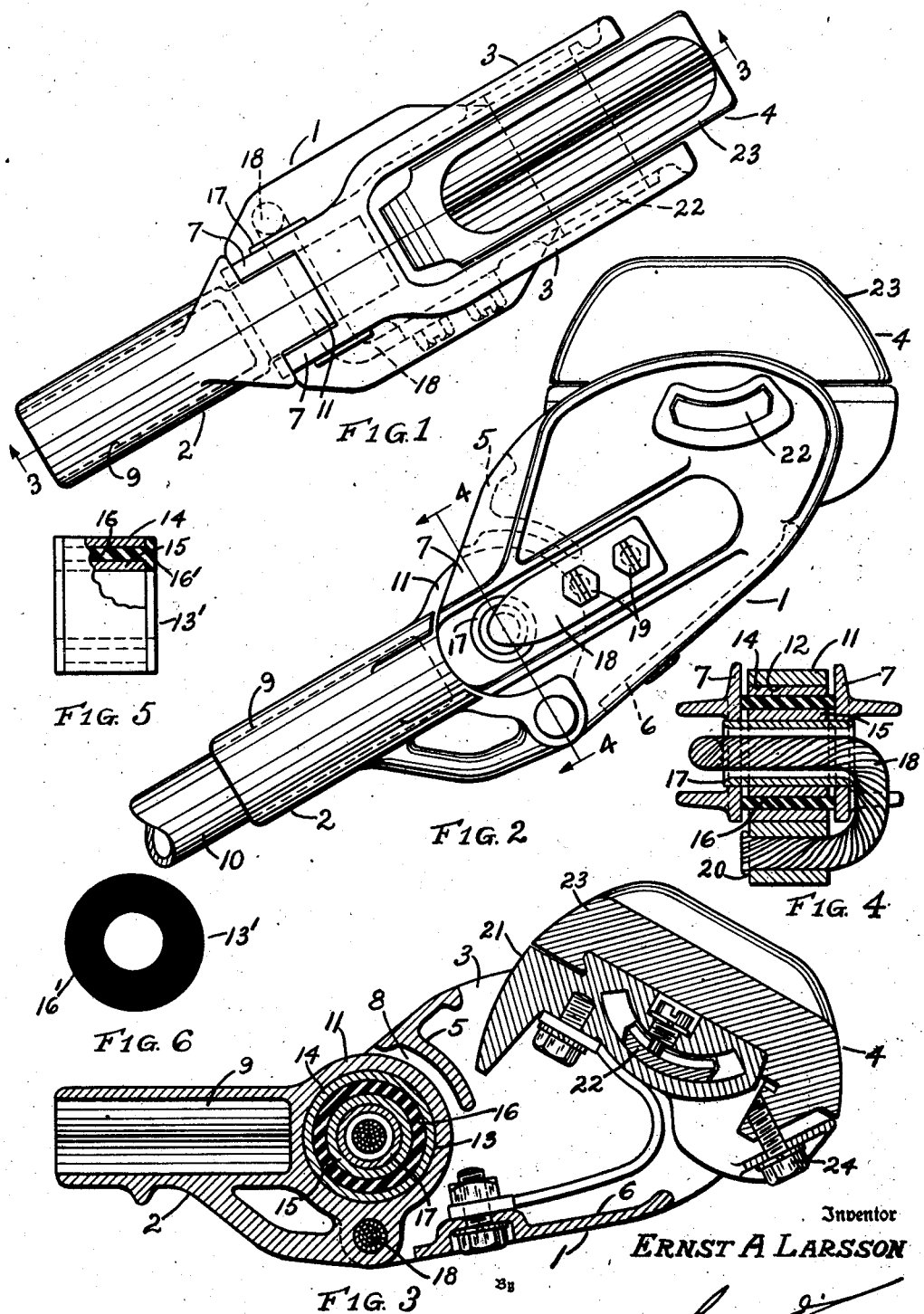

2,385,582

UNITED STATES PATENT OFFICE 2,385,582

CURRENT COLLECTOR HEAD AND TROLLEY POLE HARP

Ernst A. Larsson, Mansfield, Ohio, assignor to The Ohio Brass Company, Mansfield, Ohio, a corporation of New Jersey Application December 13, 1943, Serial No. 514,148

9 Claims. (Cl. 191—59.1)

My invention relates to current collector heads and trolley pole harps for use therewith.

Current collectors mounted on vehicles traveling at high speeds will produce vibrations which originate at the trolley wire. These vibrations and various noises are transmitted through the trolley heads, metal poles, trolley pole bases to the car body.

The car roof upon which the trolley base is mounted acts as a sounding board and thereby accentuates the noises and transposes the vibration into sound waves, all of which is very annoying and discomforting to the passengers.

Devices have been made to check the noise and vibrations before they reach the car roof and one such device is now on the market but is quite expensive and the amount of vibration-absorbing material used is considerable and at the present time is quite restricted, as in this device rubber is employed.

My invention will prevent these vibrations and noises passing from the harp to the pole and I accomplish this result by making the harp in two parts and applying a resilient vibration and noise absorbing material where the two parts of the harp are mechanically connected.

One object of my invention, other than checking the flow of noise and vibration, is to permit a limited amount of relative movement of the parts of the harp in a vertical plane but permitting less movement in a lateral direction. This limited vertical movement compensates for slight unevenness in the path of the current collector and reduces shock to the shoe which is of special advantage when carbon inserts are used as it moves along the trolley wire and tends to maintain the contact between the collector and the wire.

My invention resides in the new and useful construction, combination and relation of the parts hereinafter described and shown in the accompanying drawing.

In the drawing—

Fig. 1 is a top view of my invention.

Fig. 2 is a side view of Fig. 1 and shows in combination therewith a trolley pole mounting. The device is shown substantially at its normal operating angle.

Fig. 3 is a view in substantially full section of my invention taken on the line 3—3 of Fig. 1.

Fig. 4 is a partial transverse section taken on the line 4—4 of Fig. 2 using a modified form of vibration absorbing hinge.

Fig. 5 is a side view in partial section of a modified vibration controlling element employed between the parts of the harp.

Fig. 6 is an end view of Fig. 5.

In the preferred embodiment of my invention I provide a harp having an upper portion 1 and a lower portion 2.

The upper end of portion 1 has spaced side arms 3 between which is mounted, to oscillate, a current collector shoe 4 or a trolley wheel may be mounted therebetween in the manner shown in the prior art. The mounting of the collector shoe 4 shown is quite similar to that disclosed in my Patent 1,890,946 of December 13, 1932.

The side arms 3 of the portion 1 are held in fixed and spaced relation by the cross members 5 and 6 which are cast integral with the side arms.

The lower end of the upper portion 1 is formed with two short and spaced arms 7 forming a clevis 8.

The lower portion 2 is provided with a socket 9 at its lower end to receive a pole or other support 10 while the upper end of portion 2 is formed into a tongue-like member 11 which fits in the space 8 between the arms 7.

The tongue portion 11 has a through bore 12 to receive the vibration controlling element 13 shown in Figs. 3 and 4.

This element 13 comprises three essential parts, viz., an outer metal sleeve 14, an inner metal sleeve 15 and an interposed resilient member 16.

This resilient member 16 is composed preferably of rubber of the required properties and which is secured to the adjacent surfaces of the sleeves 14 and 15 through the medium of a vulcanized union. This provides a resilient joint element 13 in which the resilient portion 16 will take both the radial and the torsional forces applied thereto.

The sleeve element 14 is provided with an outer diameter corresponding to the inner diameter of the bore 12 requiring the element 13 to be pressed into position thereby preventing relative movement of the sleeve member 14 and of the portion 2.

The clevis arms 7 at the lower end of the upper portion 1 are bored out to a diameter corresponding to the inner diameter of the sleeve 15 and which diameters correspond to the outer diameter of an auxiliary sleeve 17 which is a press fit with the aforesaid diameters thereby preventing any relative movement of the upper portion 1 and the sleeve 15.

The resilient portion 16 is such that it permits a limited relative angular or torsional movement of the upper and lower portions 1 and 2 which may be termed an oscillatory movement.

The construction and composition of the resilient element 16 is such that the said angular or torsional movement is limited and if the force tending to create this movement is too much in excess of normal operating forces, the resilient member 16 will be torn.

In Fig. 4, the resilient element 16 projects beyond the ends of the sleeves 14 and 15, thereby filling the space between the clevis arms 7; in Fig. 5, the resilient element 16 projects beyond the ends of the sleeves 14 and 15 but covers the ends of the sleeves 14 and 15 as at 16'. In Fig. 1, the resilient element 16 does not project beyond the sleeves 14 and 15.

There is also a limited relative longitudinal movement of the portions 1 and 2 depending upon the compressive strength and the resiliency of the element 16.

Thus the vibrations and shocks to which the collector is subjected as it travels along the overhead trolley wire will be absorbed by the resilient material 16 permitting a relative movement of the portions 1 and 2 within controlled and predetermined limits.

In the construction described and shown in Fig. 1, portions 1 and 2 are mechanically secured together and also insulated to a degree, but quite fully when the vibration absorbing member shown in Figs. 4 and 5 are used and therefore I provide improved means to electrically connect portions 1 and 2.

I provide a cable or shunt 18 of flexible cable, preferably copper, which has one end flattened and attached to the side of the upper portion 1 by the screws 19. The cable is then carried through the unobstructed hollow of the sleeve 17 to the other side of the device, and is secured, as by soldering or brazing or other suitable means, to the lower portion 2 as at 20.

By this construction, the shunt 18 is located at the center of movement of the portions 1 and 2, that is on the neutral axis, where movement is slight, therefore the bending of the shunt due to the said movements of the portions 1 and 2 is very slight, in fact practically nil.

The shoe 4 is not claimed specifically but comprises a holder 21 mounted on the arcuate bearing 22 for oscillation. The renewable wear portion 23 is secured in position by the bolt 24.

The material of the vibration absorbing members 13 and 13' is preferably of rubber, such as car-spring rubber, but I find that some of the so-called synthetic or substitute products thereof may be used and also some of the so-called flexible plastics.

The resilient member 16, which bridges the space between the sleeves 14 and 15, is secured to the attaching surfaces of the sleeves by a surface union which may be produced by various means well-known to those versed in the art of rubber manipulation and of synthetics and plastics and whereby the resilient member 16 sustains the axial thrust, the torsional and the radial forces applied to the same.

The amount of resilient material used in my improved construction is very much less than that used in prior art devices.

I use the word "pintle" in the claims as a convenient term for the resilient vibration absorbing element 13 and 13' comprising the parts 14, 15 and 16 as it functions to hold the portions 1 and 2 against separation and permits limited relative oscillation of the portions much like a hinge pintle.

Figs. 5 and 6 show a slight modification of the resilient member 13 of Fig. 4 in that the projecting ends 16' of the resilient element 16 are spread out giving more extensive contact surface and help in maintaining electrical separation of the portions.

As previously pointed out the shock and vibration absorbing elements may be constructed the same as shown in Figs. 4, 5 and 6 except the projecting end portions of the element 16 would be omitted. In that case the clearance between the arms 7 and tongue 11 may be comparatively small as in Fig. 1.

I claim:

1. A trolley pole harp comprising in combination a two-part device, one portion of the harp having means for attachment to a support, the other portion having means to receive and support a current collector, one portion having a clevis at one end and the other portion having a tongue at one end, the said tongue positioned in the clevis to form a hinge joint, resilient means acting as a pintle to hold the portions against separation and immovably secured to each part of said hinge joint whereby the portions may oscillate through a limited angle, the said resilient means having a central bore therethrough and a flexible cable having its ends secured to the portions of the harp, the intermediate portion of the cable passing through the said central bore.

2. A trolley pole harp comprising in combination a two-part device, one portion of the harp having means for attachment to a support, the other portion having means to receive and support a current collector, one portion having a clevis at one end and the other portion having a tongue at one end, the said tongue positioned in the clevis to form a hinge joint, separate and spaced means acting as a pintle to hold the portions against separation and immovably secured to each part of said hinge joint and resilient means secured to each separate means whereby the separate means are maintained in said spaced relation and permit relative oscillations of the portions through a limited angle, the said pintle having a central bore therethrough and a cable having its ends secured to the portions of the harp, the intermediate portion of the cable passing through the said central bore.

3. In a trolley pole head comprising a portion having means to connect to a support and another portion arranged to oscillate relative to the first portion and having a current collector mounted thereon and one portion having a clevis end and the other portion having a tongue interfitting with said clevis end and a relatively large bore through the tongue portion and a relatively small bore through the arms of the clevis portion, the said bores having a common axis, the combination with the said tongue and clevis of a vibration absorbing pintle whereby the portions are held in predetermined relation with limited oscillation, the said pintle comprising an outer and an inner sleeve with a common axis and an interposed resilient member having a surface union with the oppositely disposed surfaces of the sleeves whereby a limited relative rotation of the sleeves is permitted against the torsional force set up in the resilient member, the outer sleeve having an immovable surface connection with the bore through the tongue and an auxiliary sleeve positioned in the bore of the inner sleeve and in the bore of the clevis and having an immovable surface connection with the inner sleeve and with the clevis whereby the said portions are held in position and having limited relative oscillation, an elongated shunt having its ends connected to the respective portions and passing through the bore of the said auxiliary sleeve whereby movement of the shunt intermediate its ends is practically nil.

4. A resilient pintle comprising in combination a pair of complete metal sleeves of the same length with one sleeve positioned within and spaced from the outer sleeve and their end faces even, resilient non-metallic material interposed between the sleeves and having a surface union with each sleeve whereby relative rotation of the sleeves is resisted, the said resilient material extending beyond the ends of the sleeves and covering the end faces thereof and a third sleeve extending through the opening in the inner sleeve and projecting beyond the face of the inner sleeve at each end thereof and having a drive-fit with said inner sleeve whereby the inner and third sleeves are non-rotatable to each other but having a limited rotatable relation to the outer sleeve.

5. A resilient pintle comprising in combination a sleeve portion of resilient non-metallic material, a metal sleeve of the same length as the resilient sleeve completely encircling the resilient sleeve and having a surface union therewith, insulating material covering the end faces of the metal sleeve, a second metal sleeve completely encircled by the resilient sleeve and having a surface union therewith, the metal sleeves having a limited relative rotation about the axis of the second sleeve, and a third metal sleeve of greater length than the second sleeve and having a driving-fit into the opening through the second metal sleeve whereby the second and third sleeves are relatively non-rotatable, the third sleeve projecting beyond and end faces of the insulating material covering the end faces, of the second sleeve for attachment to a hinge member.

6. A trolley head comprising, a harp having one portion to connect to a support, a second portion to support a current collector, a current collector pivotally mounted on the second portion to engage a trolley wire, means on each portion interfitting with the means on the other portion forming part of an oscillating joint, the said means provided with bores of different diameter having a common axis, a sleeve positioned in the bore of one portion and non-rotatable relative thereto and of substantially the same length as that of said one portion, a second sleeve spaced from the first sleeve and concentrically related thereto, a tubular third sleeve positioned in the bore of the other portion and associated with the second sleeve and non-rotatable relative to the said other portion and to the second sleeve, the said third sleeve adapted to receive a jumper cable, resilient non-metallic material interposed between the first and the second sleeves and secured thereto and projecting beyond the end faces of at least one sleeve whereby the portions may oscillate relative to each other in a vertical plane and limit the amount of said oscillation and of the current collector and insulate the flow of sound waves from passing from one portion to the other portion.

7. A trolley head comprising a harp having three portions, one portion having a tongue and means to receive a support, a second portion having a clevis interfitting with the tongue and also having means to mount a current collector thereon and a third portion securing the portions together whereby the collector may yieldingly engage the under surface of a trolley wire, the first and second portions provided with through bores of different diameter, the larger bore being in said tongue and the smaller bore being in said clevis, the third portion comprising a metal sleeve secured in the bore of one portion against relative movement thereto and a second metal sleeve spaced from the first metal sleeve and resilient non-metallic means positioned between the said sleeves and secured thereto whereby the sleeves may oscillate relative to each other, metallic means so secured in the bore of the other portion and so secured to the second sleeve that the second sleeve is held against movement relative to the said other portion and the said first and second portions may oscillate relative to each other in a vertical plane to yieldingly hold the current collector against the trolley wire and a jumper cable connecting said first and second harp portions.

8. A trolley pole head comprising in combination, a harp formed of two portions, one portion having means to attach it to a support and a current collector mounted on the other portion and transversely disposed resilient means securing the portions together, the last said means comprising a pair of concentric metal sleeves held in spaced relation by resilient non-metallic material which has a surface union with one surface of each sleeve whereby the said sleeves may oscillate relative to each other through a limited angle, the sleeves being so constructed and so immovably secured to the portions of the harp at their adjacent ends that one portion may oscillate relative to the other portion in a vertical plane at right angles to the axis of the resilient means to yieldingly hold the current collector in engagement with the under surface of a trolley wire and to limit the relative oscillation of the portions, and flexible metallic means extending through the resilient means along the transverse axis thereof to electrically connect the portions of the harp whereby the torsional movement in the flexible means and its resistance to the relative movement of the portions of the harp are a minimum.

9. In a trolley head comprising a harp having one portion to connect to a support and another portion having a current collector mounted thereon to engage the lower surface of a trolley wire and means on each portion interfitting with the means on the other portion forming parts of an oscillating joint having spaced side faces, the said means on each portion formed with transversely disposed bores of different diameters, the combination with the portions of a pintle secured to the portions, the pintle comprising outer and inner circumferentially complete sleeves of metal of the same length and having even end faces and one sleeve positioned within the other sleeve and spaced therefrom with resilient non-metallic material interposed between the sleeves and having a surface unison with each sleeve whereby relative rotation of the sleeves is resisted, the resilient material extending beyond the ends of the sleeves and covering the end faces thereof, the outer sleeve being positioned within the larger bore and secured against movement relative to one of said portions and a third sleeve extending through the opening in the inner sleeve and projecting beyond the end faces of the inner sleeve and having a drive fit with the inner sleeve, the projecting ends of the third sleeve extending into the smaller bore and secured against movement relative to the other portion, the said resilient material permitting limited movement of one harp portion relative to the other harp portion about the longitudinal axis of the third sleeve.

ERNST A. LARSSON.